United States Patent
Park

(10) Patent No.: US 9,583,965 B2
(45) Date of Patent: Feb. 28, 2017

(54) DEVICE AND METHOD FOR CONTROLLING CHARGING PATH OF MOBILE TERMINAL

(71) Applicant: Samsung Electronics Co., Ltd, Gyeonggi-do (KR)

(72) Inventor: Junghoon Park, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 13/999,354

(22) Filed: Feb. 14, 2014

(65) Prior Publication Data

US 2014/0225558 A1 Aug. 14, 2014

(30) Foreign Application Priority Data

Feb. 13, 2013 (KR) .......................... 10-2013-0015223

(51) Int. Cl.
*H02J 7/00* (2006.01)
*H02J 7/02* (2016.01)
*H02J 5/00* (2016.01)

(52) U.S. Cl.
CPC ............ *H02J 7/025* (2013.01); *H02J 7/0055* (2013.01); *H02J 5/005* (2013.01); *H02J 2007/0062* (2013.01); *Y02B 40/90* (2013.01)

(58) Field of Classification Search
USPC ......................................... 320/108
See application file for complete search history.

(56) References Cited

U.S. PATENT DOCUMENTS

| 2011/0050164 A1* | 3/2011 | Partovi | H01F 5/003 320/108 |
| 2011/0202777 A1* | 8/2011 | Hijazi | G06F 1/263 713/300 |
| 2012/0161697 A1* | 6/2012 | Park | G06F 1/263 320/108 |

* cited by examiner

*Primary Examiner* — Bryce Aisaka

(57) ABSTRACT

A device and method for controlling a charging path of a mobile terminal are provided. The charging path control device of a mobile terminal includes a power supply unit touch screen uniting a battery. The charging path control device also includes a charging unit configured to charge the battery by wire from an external power source and charge the battery by wireless from the external power source. The charging path control device also includes a controller configured to control a charging path to one of a wire charging path, wireless charging path, and wired and wireless simultaneous charging path based on a charge efficiency level to perform charge through the charging unit.

9 Claims, 6 Drawing Sheets

FIG. 6

| Division | V_BUS_INT | WPC_INT | Wire OVLO | Wireless OVLO | GPIO_1 | GPIO_2 | Result |
|---|---|---|---|---|---|---|---|
| Wire ○<br>Wireless ○ | Low | Low | High | Low | HI-Z | High | Wired charging |
| Wire ○<br>Wireless ○ | Low | Low | High | High | HI-Z | HI-Z | Wired charging<br>+<br>Wireless charging |
| Wire ×<br>Wireless ○ | High | Low | Low | High | High | HI-Z | Wireless charging |

DEVICE AND METHOD FOR CONTROLLING CHARGING PATH OF MOBILE TERMINAL

CROSS-REFERENCE TO RELATED APPLICATION(S) AND CLAIM OF PRIORITY

The present application is related to and claims the benefit under 35 U.S.C. §119(a) of a Korean patent application filed on Feb. 13, 2013 in the Korean intellectual property office and assigned serial No. 10-2013-0015223, the entire disclosure of which is hereby incorporated by reference.

TECHNICAL FIELD

The present disclosure relates to a device and method for controlling a charging path of a mobile terminal, and more particularly, to a device and method for controlling a charging path of a mobile terminal that controls a charging path such that wired charge and wireless charge are simultaneously performed.

BACKGROUND

Due to remarkable development of information and communication technology and semiconductor technology, spread and use of a mobile terminal rapidly increase. Mobile terminals provide various functions such as a communication function, music reproduction function, text message transmitting and receiving function, digital broadcasting receiving function, short range wireless communication function, and Internet connection function.

The mobile terminal generally uses a battery for portability. Because amperage charged in the battery is limited, it is difficult to use the mobile terminal for a long time. Accordingly, a user should charge a battery through a wire charge cable or should change and use the battery to another battery. In order to solve such inconvenience, nowadays, mobile terminals having a wireless charge function are available. However, the mobile terminal having a wireless charge function can perform only one of wired charge and wireless charge and cannot simultaneously perform wired charge and wireless charge.

SUMMARY

To address the above-discussed deficiencies, it is a primary object to provide a device and method for controlling a charging path of a mobile terminal that controls the charging path to simultaneously perform wired charge and wireless charge.

In accordance with an aspect of the present disclosure, a charging path control device of a mobile terminal includes a power supply unit including a battery. The charging path control device also includes a charging unit configured to charge the battery by wire from an external power source and charge the battery by wireless from the external power source. The charging path control device also includes a controller configured to control a charging path to one of a wire charging path, wireless charging path, and wired and wireless simultaneous charging path based on a charge efficiency level to perform charge through the charging unit.

In accordance with another aspect of the present disclosure, a charging path control device of a mobile terminal includes a power supply unit including a battery The charging path control device also includes a charging unit configured to charge the battery by wire from an external power source and charge the battery by wireless from the external power source The charging path control device also includes a controller configured to control a charging path to simultaneous perform a wired charge and a wireless charge through the charging unit.

In accordance with another aspect of the present disclosure, a method of controlling a charging path of a mobile terminal includes performing one of a wired charge that charges a battery provided in the mobile terminal by wire from an external power source and a wireless charge that charges the battery by wireless from an external power source. The method also includes changing the charging path such that the wired charge and the wireless charge are simultaneously performed, when both the wired charge and the wireless charge are available in a state one of the wired charge and the wireless charge is performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a table of operation of controlling a charging path in the hardware structure of FIG. 5.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, example embodiments of the present disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the present disclosure.

Figure 1:
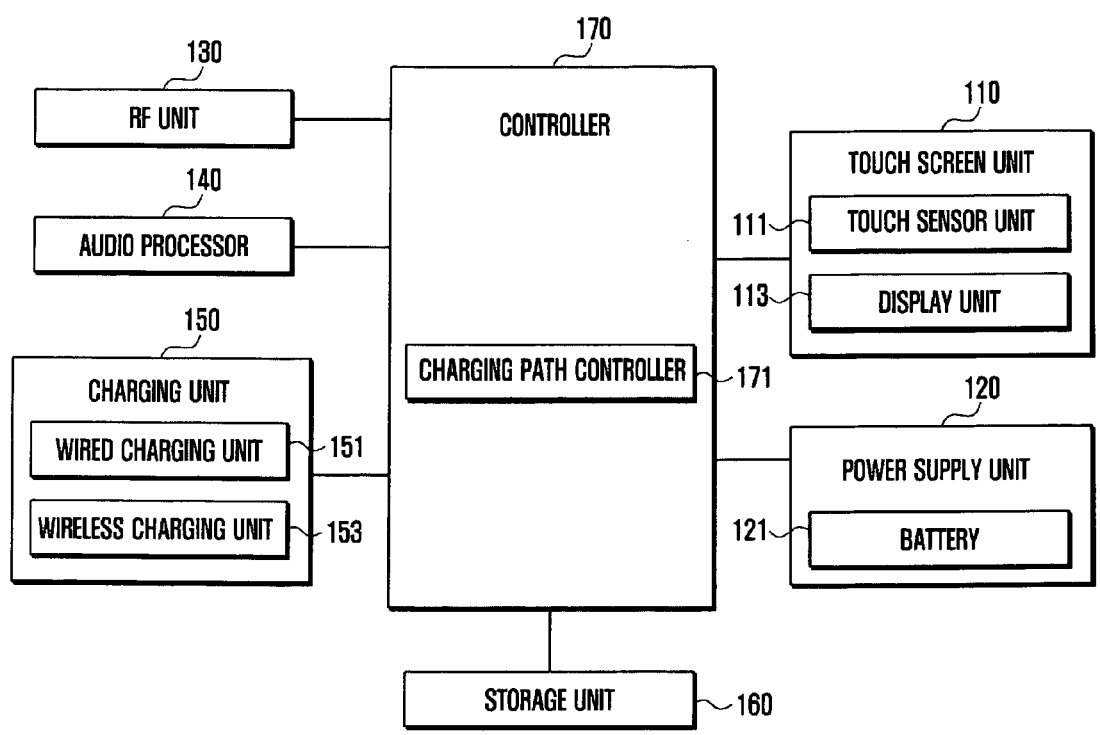
FIG. 1 illustrates a block diagram of a configuration of a mobile terminal according to an example embodiment of the present disclosure.

FIG. 1 illustrates a block diagram of a configuration of a mobile terminal 100 according to an example embodiment of the present disclosure.

The mobile terminal 100 according to the present example embodiment includes a touch screen unit 110, power supply unit 120, radio frequency (RF) unit 130, audio processor 140, charging unit 150, storage unit 160, and controller 170.

The touch screen unit 110 may include a touch sensor unit 111 and a display unit 113. The touch sensor unit 111 and the display unit 113 may be formed in an interlayer structure. The touch sensor unit 111 converts a change such as a pressure applied to a specific portion of the display unit 113 or capacitance generating in a specific portion to an electrical input signal. In this embodiment, the touch sensor unit 111 may detect a pressure upon touching as well as a touched position and area.

The touch sensor unit 111 detects a user's touch input, generates a detection signal, and outputs the detection signal to the controller 170. The detection signal may include coordinate information touched by a user. When the user of the mobile terminal moves (drag) a finger in a state where the finger continues to touch the touch screen, the touch sensor unit 111 generates a detection signal including coordinate information of a moving path and outputs the detection signal to the controller 170.

The touch sensor unit 111 may be formed with a touch detection sensor such as capacitive overlay, resistive overlay, surface acoustic wave, and infrared beam or may be formed with a pressure sensor. Entire kinds of sensor devices that can detect a contact or a pressure of an object in addition to such sensors may be formed with the touch sensor unit 111 of the present example embodiment.

The display unit 113 visually provides a menu, input data, function setting information, and various information of the mobile terminal 100 to the user. The display unit 113 performs a function of outputting a booting screen, standby screen, menu screen, communication screen, and other application screens of the mobile terminal 100.

The display unit 113 may be formed with a liquid crystal display (LCD), organic light emitting diode (OLED), active matrix organic light emitting diode (AMOLED), flexible display, and three-dimensional display (3D display).

The power supply unit 120 includes a battery 121 and supplies power necessary for operation of each constituent element of the mobile terminal 100. Here, the battery 121 may be an integral battery fixed to the mobile terminal 100 or may be a separate battery that can be detached from the mobile terminal 100.

The RF unit 130 performs a transmitting and receiving function of corresponding data for wireless communication of the mobile terminal 100. The RF unit 130 includes an RF transmitter for up-converting a frequency of a signal to be transmitted and amplifying the signal, and an RF receiver for down-converting a frequency of a received signal and low-noise amplifying the signal. Further, the RF unit 130 receives data through a wireless channel to output the data to the controller 170 and transmits data output from the controller 170 through a wireless channel.

The audio processor 140 may be formed with a coder and decoder (codec), and the codec may be formed with a data codec that processes packet data and an audio codec that processes an audio signal such as sound. The audio processor 140 converts a digital audio signal to an analog audio signal through the audio codec and reproduces the analog audio signal through a speaker and converts an analog audio signal input from a microphone to a digital audio signal through the audio codec.

The charging unit 150 charges the battery 121 from an external power source. For this, the charging unit 150 includes a wired charging unit 151 and a wireless charging unit 153. The wired charging unit 151 charges the battery 121 by wire from the external power source. For example, the wired charging unit 151 receives supply of power from the external power source through a charge cable connected to the mobile terminal 100 and charges the battery 121. The charge cable may be a TA cable, USB cable, and Pogo cable. The wireless charging unit 153 charges the battery 121 by wireless from the external power source. The wireless charging unit 153 may perform wireless charge using a magnetic induction method or a resonant induction method. Here, the magnetic induction method is a method in which an electromagnetic field occurs in a coil provided in a charge pad when connecting a power source to the charge pad and in which a power receiver (not shown) provided in the mobile terminal 100 receives an induced current according to an electromagnetic induction phenomenon and charges the battery 121. The resonant induction method is a method of loading a resonant coil of the same frequency in a charge pad and a power receiver and in which a power receiver receives a current using resonance and charges the battery 121.

The storage unit 160 performs a function of storing a program and data necessary for operation of the mobile terminal 100 and may be divided into a program area and a data area. The program area may store a program that controls general operations of the mobile terminal 100, operating system (OS) for booting the mobile terminal 100, application program necessary for reproducing multimedia contents, and other option functions of the mobile terminal 100, for example an application program necessary for an audio dedicated communication function, camera function, sound reproduction function, and image or moving picture reproduction function. The data area is an area that stores data generating according to use of the mobile terminal 100 and may store an image, moving picture, phonebook, and audio data.

The controller 170 controls general operations of each constituent element of the mobile terminal 100. The controller 170 controls a charging path to one of a wire charging path, wireless charging path, and wired and wireless simultaneous charging path and charges the battery 121 through the charging unit 150. For this, the controller 170 according to the present example embodiment may have a charging path controller 171.

Hereinafter, a charging path control process according to an example embodiment of the present disclosure is described with reference to FIG. 2.

Figure 2:
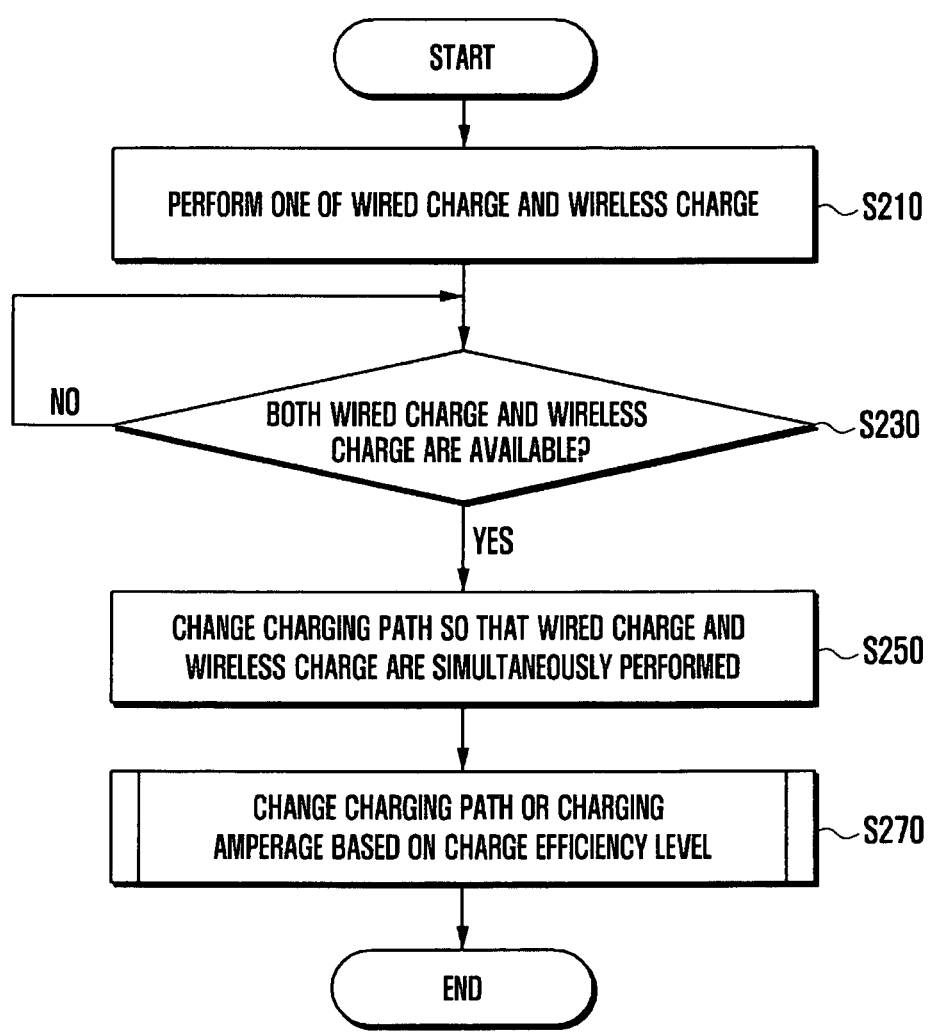
FIG. 2 illustrates a process of a charging path control process according to an example embodiment of the present disclosure.

FIG. 2 illustrates a process of a charging path control process according to an example embodiment of the present disclosure.

Referring to FIG. 2, when wired charge or wireless charge is available, the charging unit 150 performs one of wired charge and wireless charge S210.

The charging path controller 171 determines whether both wired charge and wireless charge are available S230.

If both wired charge and wireless charge are available, the charging path controller 171 changes a charging path such that wired charge and wireless charge are simultaneously performed S250. That is, in a state in which one of wired charge and wireless charge is performed, if both wired charge and wireless charge are available, the charging path controller 171 changes a charging path such that wired charge and wireless charge are simultaneously performed through the charging unit 150. Here, the charging path controller 171 may control a charging path using a switch as a charging path control means. In this way, in a state in which both wired charge and wireless charge are available, by controlling a charging path to simultaneously perform wired charge and wireless charge, a charging time can be shortened.

In this embodiment, if present charging amperage is smaller than preset charging amperage, the charging path controller 171 may change a charging path to simultaneous perform wired charge and wireless charge through the charging unit 150. For example, in a state in which wired charge is presently performed, when it is assumed that preset charging amperage of the mobile terminal 100 is '2 A (Ampere)' and present charging amperage through wired charge is '1 A', if both wired charge and wireless charge are available, present charging amperage '1 A' is smaller than preset charging amperage '2 A' and thus the charging path controller 171 may change a charging path to simultaneous perform wired charge and wireless charge. In this way, when charging amperage by wired charge or wireless charge is insufficient, by changing a charging path such that wired charge and wireless charge are simultaneously performed, a charging time can be shortened.

The charging path controller 171 changes a charging path or charging amperage based on a charge efficiency level S270. Here, a charge efficiency level is an index representing efficiency of charge and represents a heat generation level and a charge speed. For example, as a charge speed is fast, a charge efficiency level rises, and as heat generation increases, a charge efficiency level is lowered.

Hereinafter, change operation of a charging path or charging amperage according to an example embodiment of the present disclosure is described in detail with reference to FIG. 3.

Figure 3:
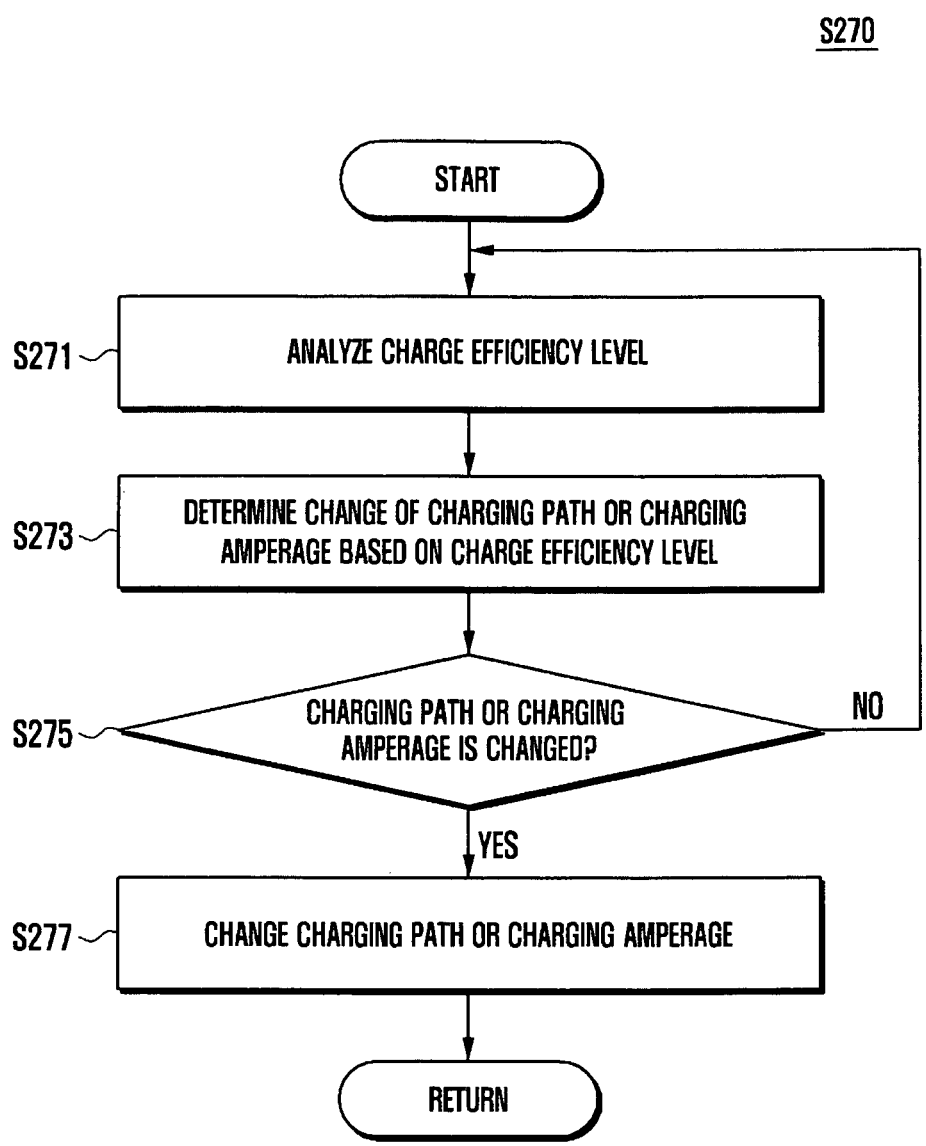
FIG. 3 illustrates a process of change operation of a charging path or charging amperage of FIG. 2.

FIG. 3 illustrates a process of change operation of a charging path or charging amperage of FIG. 2.

Referring to FIG. 3, the charging path controller 171 analyzes a charge efficiency level according to presently performing wired and wireless simultaneous charge S271. That is, the charging path controller 171 calculates a level of a heat generating by presently performing charge, a speed of presently performing charge, and an estimated charging time to be consumed for complete charge of the battery 121.

The charging path controller 171 determines a change of a charging path or charging amperage based on the charge efficiency level S273. For example, if a present heat generating level is greater than a preset value or if a present charge speed is lower than a preset value, the charging path controller 171 determines that a charging path or charging amperage is changed.

The charging path controller 171 determines whether a charging path or charging amperage is changed S275.

If a charging path or charging amperage is changed, the charging path controller 171 changes a charging path or charging amperage S277. That is, the charging path controller 171 may change the charging path to one of a wire charging path, wireless charging path, and wired and wireless simultaneous charging path. For example, in a state in which wired and wireless simultaneous charge is presently performed, when a charge efficiency level is low due to serious heat generation, the charging path controller 171 may change the charging path to a wireless charging path so as to perform only wireless charge or may change the charging path to a wire charging path so as to perform only wired charge. Further, the charging path controller 171 may change charging amperage of each of wired charge and wireless charge. For example, in a state in which wired charge and wireless charge are simultaneously performed, if a charge speed of wireless charge is relatively lower than that of wired charge, the charging path controller 171 may adjust charging amperage of wired charge upward and adjust charging amperage of wireless charge downward.

In this way, in a state in which wired charge and wireless charge are simultaneously performed, by changing a charging path or charging amperage based on a charge efficiency level, more efficient charge is available and thus a charging time can be shortened.

Hereinafter, a charging path change process according to an example embodiment of the present disclosure is described in detail with reference to FIG. 4.

Figure 4:
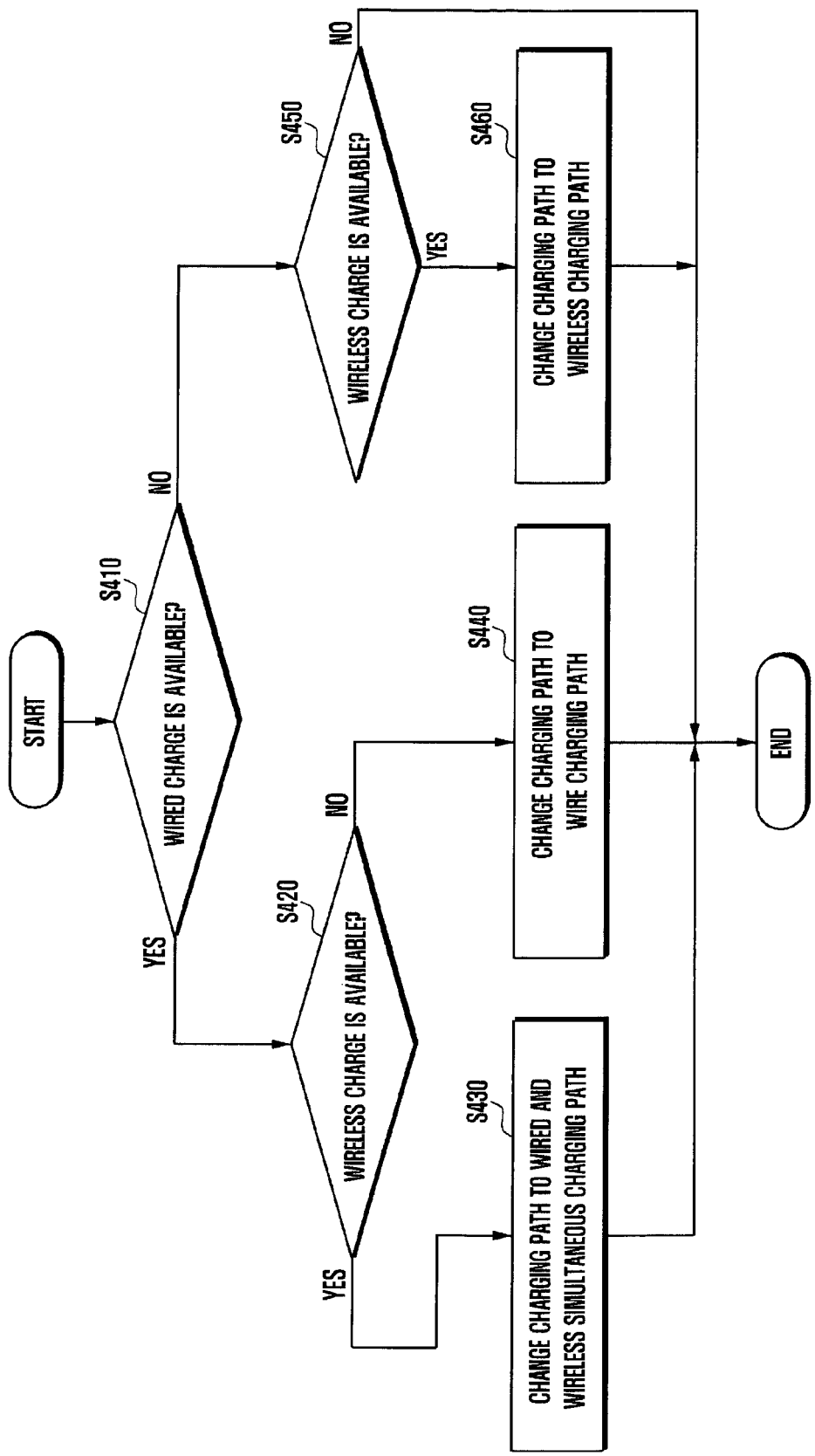
FIG. 4 illustrates a process of a charging path change process according to an example embodiment of the present disclosure.

FIG. 4 illustrates a process of a charging path change process according to an example embodiment of the present disclosure.

Referring to FIG. 4, the charging path controller 171 determines whether wired charge is available like that a charge cable such as a TA cable, USB cable, and Pogo cable is connected to the mobile terminal 100 S410.

If wired charge is available, the charging path controller 171 determines whether wireless charge is available S420.

If wireless charge is available like that the mobile terminal 100 is positioned within a predetermined distance from a charge pad, the charging path controller 171 changes the charging path to a wired and wireless simultaneous charging path S430.

If wireless charge is unavailable, the charging path controller 171 changes the charging path to a wire charging path S440.

If wired charge is unavailable at operation S410, the charging path controller 171 determines whether wireless charge is available S450.

If wireless charge is available, the charging path controller 171 changes the charging path to a wireless charging path S460.

In this way, in a situation in which only one of wired charge and wireless charge is available, the charging path is changed to a wire charging path or a wireless charging path, and in a situation in which both wired charge and wireless charge are available, by changing a charging path to a wired and wireless simultaneous charging path such that wired charge and wireless charge are simultaneously performed, charge can be more effectively performed.

Hereinafter, an example of a charging path control according to an example embodiment of the present disclosure is described with reference to FIGS. 5 and 6.

Figure 5:
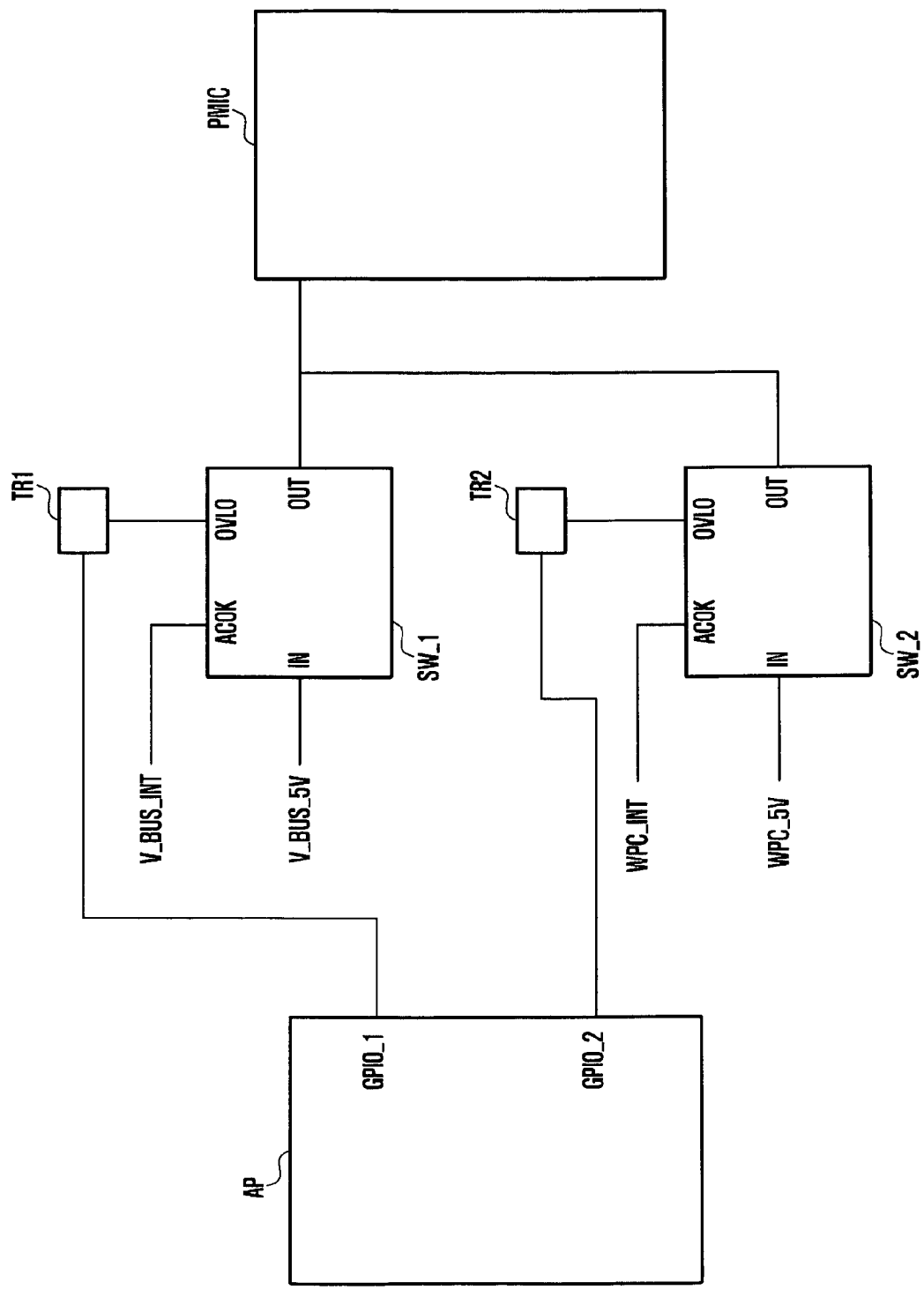
FIG. 5 illustrates a diagram of an example of a hardware structure of a mobile terminal in which a charging path control is available according to an example embodiment of the present disclosure.

FIG. 5 illustrates a diagram of an example of a hardware structure of a mobile terminal in which a charging path control is available according to an example embodiment of the present disclosure, and FIG. 6 illustrates a table of operation of controlling a charging path in the hardware structure of FIG. 5.

Referring to FIG. 5, a 'GPIO_1 port' of an application processor (AP) provided in the mobile terminal is connected to an 'OVLO port' of a wired charge switch SW_1 via a first transistor TR1, and a 'GPIO_2 port' is connected to an 'OVLO port' of a wireless charge switch SW_2 via a second transistor TR2. A general purpose input output (GPIO) is an input port or an output port prepared to use for a general purpose in a processor and may receive an electrical input when interlocking with software or may control a specific chip through an electrical output. As the first transistor TR1 or the second transistor TR2, a bipolar junction transistor (BJT) may be used. The wired charge switch SW_1 or the wireless charge switch SW_2 may be a switch having an overvoltage protection function.

The wired charge switch SW_1 provides a current injected into an 'IN port' to a power management IC (PMIC) through an 'OUT port' according to a control signal input to an 'ACOK port' and an 'OVLO port'. The wireless charge switch SW_2 provides a current injected into an 'IN port' to a PMIC through an 'OUT port' according to a control signal input to an 'ACOK port' and an 'OVLO port'.

Referring to FIG. 6, when outputting a 'Hi-Z signal' through the 'GPIO_1 port' and a 'High signal' through the 'GPIO_2 port', a charging path may be controlled to perform only wired charge. When outputting a 'Hi-Z signal' through the 'GPIO_1 port' and a 'Hi-Z signal' through the 'GPIO_2 port', a charging path may be controlled to simultaneous perform wired charge and wireless charge. When outputting a 'High signal' through the 'GPIO_1 port' and a 'Hi-Z signal' through the 'GPIO_2 port', a charging path may be controlled to perform only wireless charge.

In this way, by changing a signal output from the 'GPIO_1 port' and the 'GPIO_2 port' of an AP, a charging path may be changed to one of a wire charging path, wireless charging path, and wired and wireless simultaneous charging path.

It has been described that one wire charging path according to an example embodiment of the present disclosure exists, but the present disclosure is not limited thereto and a plurality of wire charging paths may exist according to an example embodiment. For example, when a USB connection terminal and a TA connection terminal are provided in the mobile terminal 100, a wire charging path through a USB cable and a wire charging path through a TA cable may exist. In this embodiment, a plurality of wired and wireless simultaneous charging paths may exist instead of one wired and wireless simultaneous charging path.

Further, it has been described that the controller 170 and the charging path controller 171 according to the present example embodiment are formed as a separate block, and that each block performs different functions, but this is for convenience of description and each function is not necessarily divided in this way. For example, the controller 170 may perform a specific function in which the charging path controller 171 performs.

As described above, according to the present disclosure, in a state in which both wired charge and wireless charge are available, by controlling a charging path to simultaneously perform wired charge and wireless charge, a charging time can be shortened.

Further, when charging amperage by wired charge or wireless charge is insufficient, by changing a charging path such that wired charge and wireless charge are simultaneously performed, a charging time can be shortened.

Further, in a state in which wired charge and wireless charge are simultaneously performed, by changing a charging path or charging amperage based on a charge efficiency level, more efficient charge is available and thus a charging time can be shortened.

Although the present disclosure has been described with an example embodiment, various changes and modifications may be suggested to one skilled in the art. It is intended that the present disclosure encompass such changes and modifications as fall within the scope of the appended claims.

What is claimed is:

1. A charging path control device of a mobile terminal, comprising:
    a power supply unit comprising a battery;
    a charging unit configured to charge the battery by wire from an external power source and charge the battery by wireless from the external power source; and
    a controller configured to:
        analyze a charge efficiency level based on at least one of a heat generation level and a charge speed, and
        control a charging path to one of a wire charging path, wireless charging path, or wired and wireless simultaneous charging path based on the charge efficiency level to perform the charging unit,
    wherein the controller is further configured to:
        determine whether wired charge is available;
        determine whether wireless charge is available when the wired charge is available;
        change, when present charging amperage is smaller than preset charging amperage and wireless charge is available, the charging path so that wired charge and wireless charge are simultaneously performed through the charging unit;
        determine that wired charge is available when the charge cable is connected to the mobile terminal; and
        determine that wireless charge is available when the mobile terminal is positioned within a predetermined distance from a charge pad.

2. The charging path control device of claim 1, wherein the controller is configured to control the charging path using a switch as a charging path control.

3. A charging path control device of a mobile terminal, comprising:
    a power supply unit comprising a battery;
    a charging unit configured to charge the battery by wire from an external power source and charge the battery by wireless from the external power source; and
    a controller configured to:
        analyze a charge efficiency level based on at least one of a heat generation level and a charge speed, and
        control a charging path to simultaneously perform a wired charge and a wireless charge through the charging unit,
    wherein the controller is further configured to:
        determine whether wired charge is available;
        determine whether wireless charge is available when the wired charge is available;
        change, when present charging amperage is smaller than preset charging amperage and wireless charge is available, the charging path so that wired charge and wireless charge are simultaneously performed through the charging unit;
        determine that wired charge is available when the charge cable is connected to the mobile terminal; and
        determine that wireless charge is available when the mobile terminal is positioned within a predetermined distance from a charge pad.

4. The charging path control device of claim 3, wherein the controller is configured to change the charging path to simultaneously perform the wired charge and the wireless charge through the charging unit, when both the wired charge and the wireless charge are available in a state in which one of the wired charge and the wireless charge is performed.

5. The charging path control device of claim 3, wherein the controller is configured to change the charging path to one of a wire charging path, wireless charging path, or wired and wireless simultaneous charging path based on the charge efficiency level.

6. The charging path control device of claim 3, wherein the controller is configured to change charging amperage of each of the wired charge and the wireless charge based on the charge efficiency level in a state in which the wired charge and the wireless charge are simultaneously performed.

7. A method of controlling a charging path of a mobile terminal, comprising:
    performing one of a wired charge that charges a battery provided in the mobile terminal by wire from an external power source and a wireless charge that charges the battery by wireless from an external power source;
    analyzing a charge efficiency level based on at least one of a heat generation level and a charge speed; and
    changing a charging path such that the wired charge and the wireless charge are simultaneously performed, when both the wired charge and the wireless charge are available in a state one of the wired charge and the wireless charge is performed,
    wherein the changing of a charging path comprises:
        determining whether wired charge is available;
        determining whether wireless charge is available when the wired charge is available;
        changing, when present charging amperage is smaller than preset charging amperage and wireless charge is available, the charging path to simultaneously perform wired charge and wireless charge;
        determining that wired charge is available when the charge cable is connected to the mobile terminal; and
        determining that wireless charge is available when the mobile terminal is positioned within a predetermined distance from a charge pad.

8. The method of claim 7, further comprising changing the charging path to one of a wire charging path, wireless charging path, or wired and wireless simultaneous charging path based on the charge efficiency level.

9. The method of claim 7, further comprising changing charging amperage of each of the wired charge and the wireless charge based on the charge efficiency level in a state in which the wired charge and the wireless charge are simultaneously performed.

* * * * *